Nov. 23, 1926.  1,608,086
W. H. DOUGLAS ET AL
VEHICLE WHEEL CARRYING MECHANISM
Filed August 27, 1924     2 Sheets-Sheet 1
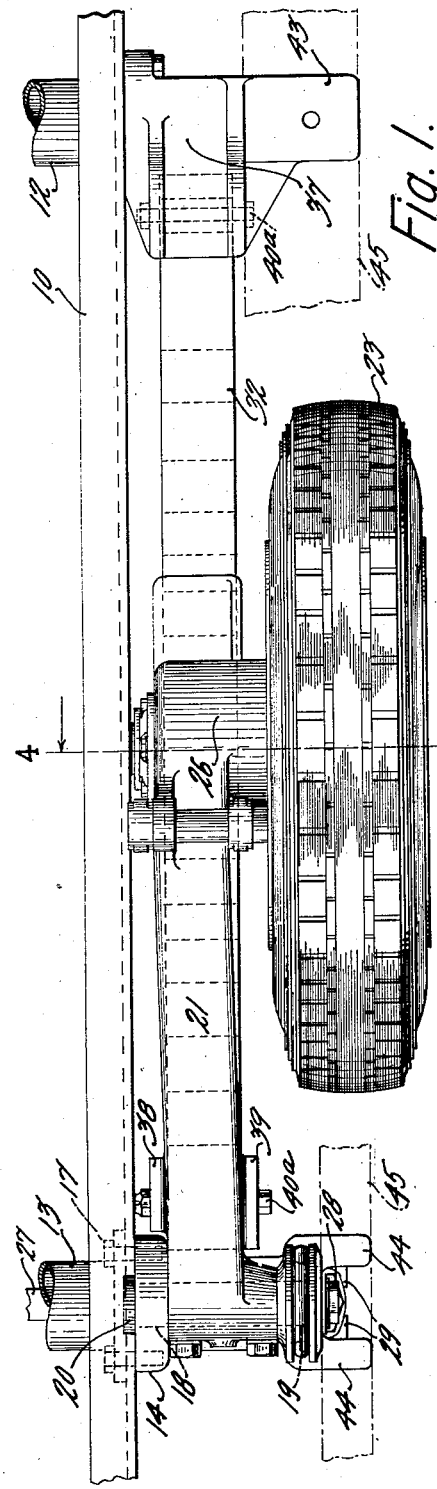
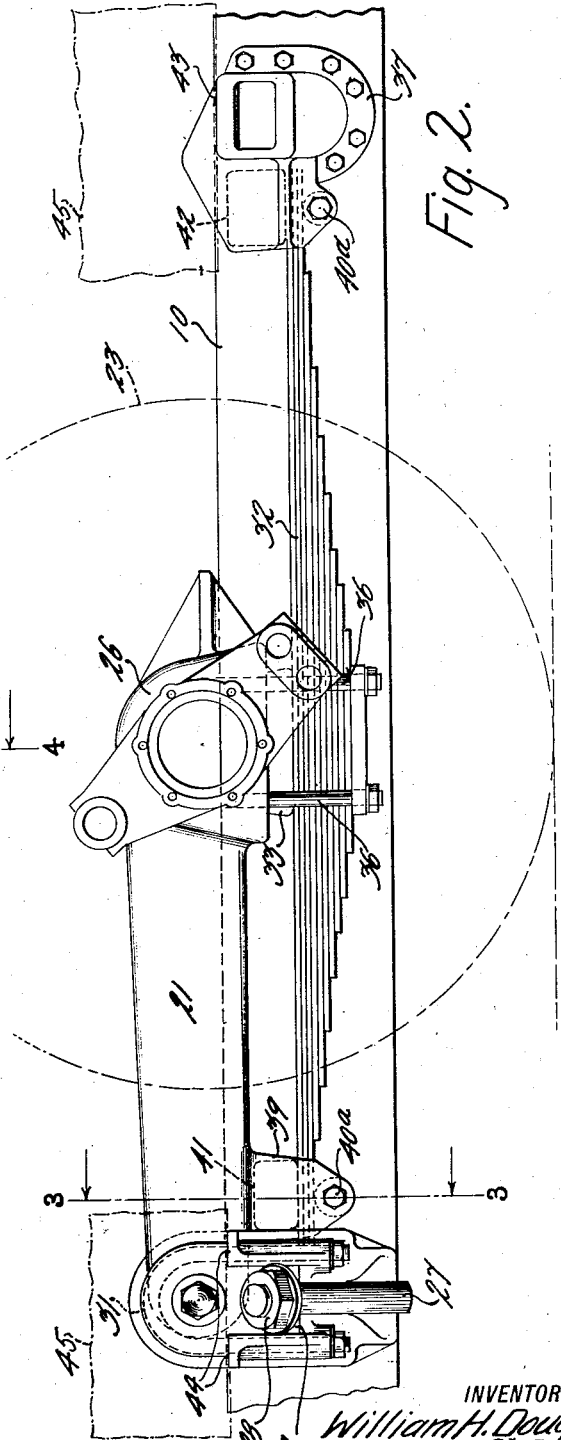
INVENTORS
William H. Douglas
Roland Chilton
by
ATTORNEY Nov. 23, 1926.　　　　　　　　　　　　　　　　　1,608,086
W. H. DOUGLAS ET AL
VEHICLE WHEEL CARRYING MECHANISM
Filed August 27, 1924　　2 Sheets-Sheet 2
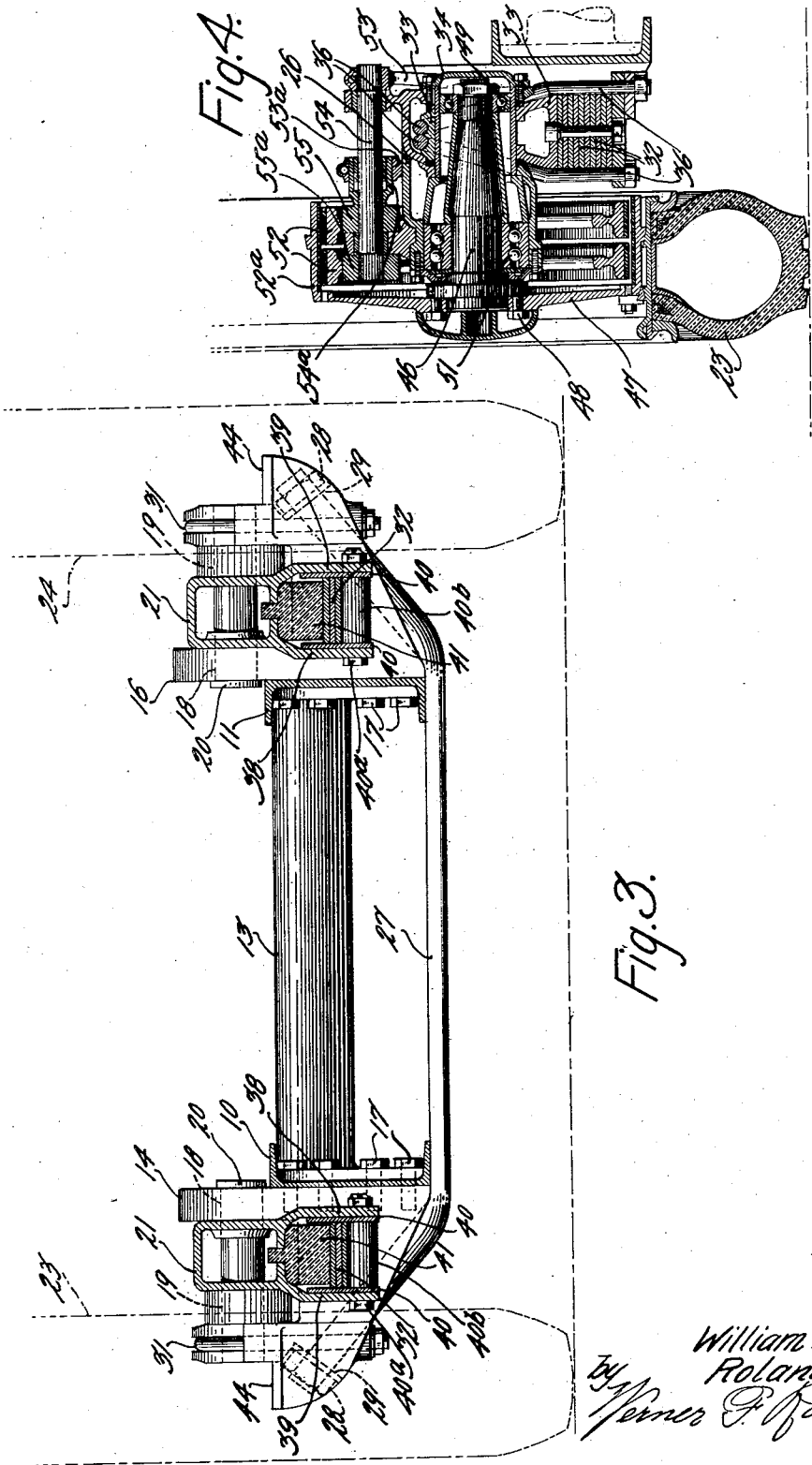
INVENTORS
William H. Douglas
Roland Chilton
by Verner F. Rothermund
ATTORNEY Patented Nov. 23, 1926.

1,608,086

UNITED STATES PATENT OFFICE.

WILLIAM H. DOUGLAS AND ROLAND CHILTON, OF KEYPORT, NEW JERSEY, ASSIGNORS TO AEROMARINE PLANE & MOTOR COMPANY, INC., A CORPORATION OF NEW YORK.

VEHICLE WHEEL-CARRYING MECHANISM.

Application filed August 27, 1924. Serial No. 734,451.

This invention relates to improvements in the method of connecting vehicle wheels to a vehicle for spring action. The invention is of special application to vehicles having a relatively low frame and floor line, and one of the principal objects of the invention is to avoid the upsweep of the frame and increase of floor height necessary to clear the usual axle structure connecting the wheels. As an example, the case of a vehicle having 18" frame height and a 9" depth of frame member may be taken. This gives a ground clearance under the frame of 9" which is also a desirable ground clearance under the axle. In that case a 6" spring action from normal and an axle of 4" depth would necessitate a 10" upsweep in the frame members, which tends to increase the cost and reduce the rigidity of these members and also interferes with the clear floor space on the vehicle.

Another object of this invention is to afford a supporting means for the wheel which shall permit either wheel to rise and fall under the action of the springs in a vertical manner and without tilting the other wheel.

A further object of this invention is to afford positive and effective means for the location of the wheel during its travel under spring action and for resisting the various load reactions set up between the wheel and the vehicle under operating conditions.

Conventional leaf springs are shown in the drawings and it will be seen that the principal load action coming on the structure as a whole is a bending moment due to the spring load acting at an arm represented by the distance between the center of the spring and of the tire. This produces a tipping tendency on the wheel, which is resisted in this invention by a longitudinal radius arm of great torsional stiffness secured for vertical oscillation to the frame in spaced apart bearings well adapted to resist the tilting loads referred to. These bearings are mounted on the frame by a substantial bracket on either side, while the brackets are directly connected by a cross member. It will be seen that the load reactions are such as to tend to move the outer bearing of the radius arm upwardly and the structure is reinforced against this reaction by a tension element which ties the outer bearings of the two brackets together.

The tendency of the wheel to move longitudinally of the vehicle under braking loads and road shocks is resisted by the tensional strength of the radius arm, while the brake torque reactions are resisted by the bending strength of this member so that the spring is relieved of both of these forces and is only called upon to support the weight of the vehicle and to resist side motion between the wheel and the frame.

As in the prior art, rubber blocks are used to support the vehicle from the spring, which construction has been found to materially assist in insulating the vehicle from road shocks. The springs in most conventional constructions, however, are used to effect the fore-and-aft location of the wheel or axle and accordingly special provisions are required to obtain end location of the springs through the rubber blocks. In virtue of the special construction here disclosed, such end location is unnecessary and thus these members become simple blocks of any convenient shape against which the spring merely rests. In the showing, the forward block is conveniently placed in a suitable socket on the radius arm itself, while the rear block is carried by a bracket secured to the frame, but the spirit of this invention is not departed from if both blocks be directly carried to a frame bracket.

As before stated, the restraint of the wheel against side movement relative to the vehicle is affected by the edgewise strength of the spring which is rigidly secured at its center to a rocking block which affords a pivotal attachment to the wheel end of the radius arm. In the showing this attachment encircles the wheel bearings, but a pivotal connection below the wheel center or otherwise is intended to be within the scope of this invention. The springs are located against side motion by a sliding fit engagement at their ends in the brackets containing the rubber blocks and hardened steel bearing strips are indicated in the showing at these points.

As before mentioned, the relatively high tilting moment due to the inevitable off-setting of the spring from the wheel calls for relatively great torsional strength in the radius arm. As is well known, hollow sections are the lightest which can be used to a center block 33 mounted for oscillation upon a tubular journal 34 (Fig. 4) disposed in this showing co-axial with the wheel and which also forms a housing for the inner bearing of the wheel spindle. The spring 32 is rigidly secured to this center block by the U bolts 36. The ends of the spring 32 are supported in a slidable manner at the right (Fig. 2) in a bracket 37 attached to the frame adjacent the cross member 12, and at the left in a socket formed by the downwardly projecting portions 38, 39 of the radius rod 21.

Rubber blocks 41, 42 are provided for the spring ends to bear against, which blocks assist in insulating the vehicle from road shocks, and hardened steel bearing members 40 are interposed between the sides of the springs 32 and the sockets in which the springs are secured.

Bolts 40ª with tubular distance pieces 40ᵇ pass through the brackets under the ends of the springs and afford a check against complete recoil of the springs. Horizontal shelf portions 43, 44 are provided on the brackets for the support of the vehicle body sills 45.

With reference to Fig. 4 there is shown the manner in which the wheels 23, 24 are rotatably supported from the bearing housing 26 by a wheel spindle 46 secured to the wheel disk 47 as by bolts 48. This spindle is mounted on anti-friction bearings 49, 51 suitably secured in the housing 26.

Brake shoes 52 are disposed within the brake drum 52ª rigid with the wheel disks 47 and are operated by levers 53, 53ª through shafts 54, 54ª provided with cams 55, 55ª.

Variations may be resorted to within the scope of the invention and portions of the improvements may be used without the others.

Having thus described our invention, we claim:—

1. In a vehicle having a frame, the combination of, brackets disposed outside of the frame on either side of the vehicle said brackets having spaced apart bearings, hinge pins in said bearings, radius arms of hollow cross section having one end supported by said hinge pins for vertical oscillation of their free ends past the frame in either direction, a wheel having a spindle mounted for rotation in the free end of each arm, and a cross structure connecting said brackets adapted to restrain the hinge pins against angular displacement relative to the frame.

2. In a vehicle, the combination of, a frame, brackets having spaced apart bearings secured to the outside of the frame, hinge pins in said bearings, radius arms having one end supported by the hinge pins for vertical oscillation of their free ends past the frame, a wheel having a spindle mounted for rotation in the free end of each arm, and a cross structure comprising a spaced apart compression and a tension member connecting said brackets and adapted to restrain the hinge pins against angular deflection relative to the frame.

3. In a vehicle, the combination of, a frame, brackets having spaced apart bearings secured to the outside of the frame, hinge pins in said bearings, radius arms having one end supported by said hinge pins for vertical oscillation of their free ends beyond the frame in either direction, a wheel having a spindle mounted for rotation in the free end of each arm, a cross structure comprising a spaced apart compression and a tension member rigidly connecting said brackets, and laterally rigid spring means adapted to suspend the vehicle from the radius arms.

4. In a vehicle having a frame, a wheel carrying mechanism comprising, a bracket secured to and disposed on the outside of the frame, spaced apart bearings in said bracket, a hinge pin in said bearings, a wheel carrying arm having one end hinged by said pins for the vertical oscillation of its free end past the frame in either direction, and a laterally rigid spring having its center secured to the free end of the arm said spring also having one of its ends supported by the arm adjacent its hinged portion.

5. In the art of connecting a pair of vehicle wheels for independent spring action relative to a vehicle, a pair of aligned hinge pins, a radius arm of substantial torsional strength connecting each hinge pin to a wheel and a structure for holding the hinge pins in rigid alignment, including brackets secured to the vehicle frame, a cross member of substantial compression strength disposed between the brackets and a tension member spaced apart from said cross member and engaging the brackets.

6. In a vehicle having wheels supported on radius arms, substantially aligned hinge pins, one for each arm, secured against axial deflection of the pins relative to the vehicle by a structure including a pair of brackets each having a pair of rigidly spaced apart bearings, a cross member rigid with the brackets and with the vehicle and having substantial compression strength, and a tie member spaced apart from the cross member and secured to the brackets.

7. In a structure for pivotally securing a radius arm to a vehicle against angular displacement of the free end of the arm, a bracket having spaced apart bearings to which the arm is pivoted for oscillation, a cross structure including a tension member and a compression member each rigid with the bracket, and a reinforcing means for the bracket connecting said bearing to the tension member.

8. In apparatus of the class described, the combination with a vehicle having spaced squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.

the hinge pin axes and the spindle axes, brake means at the free ends of the arms, and spring means connected to said frame members and the arms for the suspension of the vehicle from the wheels.

16. In apparatus of the class described, the combination of a pair of spaced apart longitudinal frame members, a bracket secured on the outer side of each of the frame members, an inner and an outer bearing in said brackets aligned transversely of the frame, a hinge pin in the bearings of each bracket, an inflexible arm pivoted at one end upon the hinge pin in each bracket respectively and adapted for vertical oscillation of the free end of the arm, a wheel rotatably supported at the free end of each arm, a transverse compression element between the brackets, a tension element vertically spaced apart from the compression element and constituting a tie between the brackets, and spring means between the frame members and the free ends of the arms for the suspension of the vehicle.

17. In apparatus of the class described, the combination of a vehicle frame comprising a pair of longitudinal side members, a bracket secured on the outer side of each of the members, an inner and an outer bearing in said brackets aligned transversely of the frame, a hinge pin in the bearings of each bracket, an inflexible arm pivoted at one end upon each hinge pin and adapted for vertical oscillation of the free end of the arm, wheels each having a rigidly attached spindle, bearings in the free ends of the arms in which said spindles are rotatably mounted, means associated with the brackets comprising a compression element and a tension element adapted to restrain angular displacement of the axes of the hinge pins and said spindles, and spring means associated with the arms for the suspension of the vehicle.

18. A means for rotatably mounting a pair of wheels on a vehicle for individual substantially vertical movement relative to said vehicle and in restraint of deflection of said wheels from a vertical plane, comprising, a pair of brackets one on either side of the vehicle and rigid therewith, spaced apart mutually aligned bearings in the brackets, an upper compression member and a lower tension member between said brackets and connecting therewith to restrain said bearings in rigid alignment, a hinge pin in the bearings of each bracket, a longitudinally disposed radius arm for each bracket pivoted at one end in the bearings by means of the hinge pin and formed to resist torsional deflection, a pair of wheels each having a rigidly attached spindle mounted for rotation in the free ends of the radius arms, and spring means co-acting with the radius arms for the suspension of the vehicle and adapted to prevent side motion of the wheels relative to the vehicle.

Signed at Keyport in the county of Monmouth and State of New Jersey this 25th day of August, A. D. 1924.

WM. H. DOUGLAS.
ROLAND CHILTON.